United States Patent [19]
Tildesley

[11] 3,727,254
[45] Apr. 17, 1973

[54] METHOD OF FORMING AN INSERT BUSH

[75] Inventor: John Matthew Tildesley, Wolverhampton, Staffordshire, England

[73] Assignee: The Precision Screw & Manufacturing Company Limited, Dillenhall, England

[22] Filed: May 5, 1971

[21] Appl. No.: 140,538

[52] U.S. Cl. ............... 10/86 R, 10/155 A, 151/41.73
[51] Int. Cl. ...................... B21d 53/24, B23p 19/08
[58] Field of Search .................. 10/86 R, 155 A; 29/413; 85/61; 151/41.73

[56] References Cited

UNITED STATES PATENTS

| 1,868,415 | 7/1932 | Gundersen et al | 10/155 A |
| 2,520,259 | 8/1950 | Pummill | 85/61 X |
| 2,813,568 | 11/1957 | Kilmarx | 29/413 |
| 2,858,602 | 11/1958 | Johnson | 29/413 |
| 3,037,221 | 6/1962 | Lanius | 10/155 A |
| 3,198,231 | 8/1965 | Bisbing | 151/41.73 |

*Primary Examiner*—Charles W. Lanham
*Assistant Examiner*—E. M. Combs
*Attorney*—Marshall & Yeasting

[57] ABSTRACT

An insert for providing a screw-thread when pressed into soft material includes two rings connected together and having external inclined splines of opposite hand, so that in the pressing operation the two rings are contra-rotated, and can lock together. The insert is made as a one-piece construction, and is divided into two pieces which are fixed together, in a single press movement.

2 Claims, 4 Drawing Figures

PATENTED APR 17 1973 3,727,254
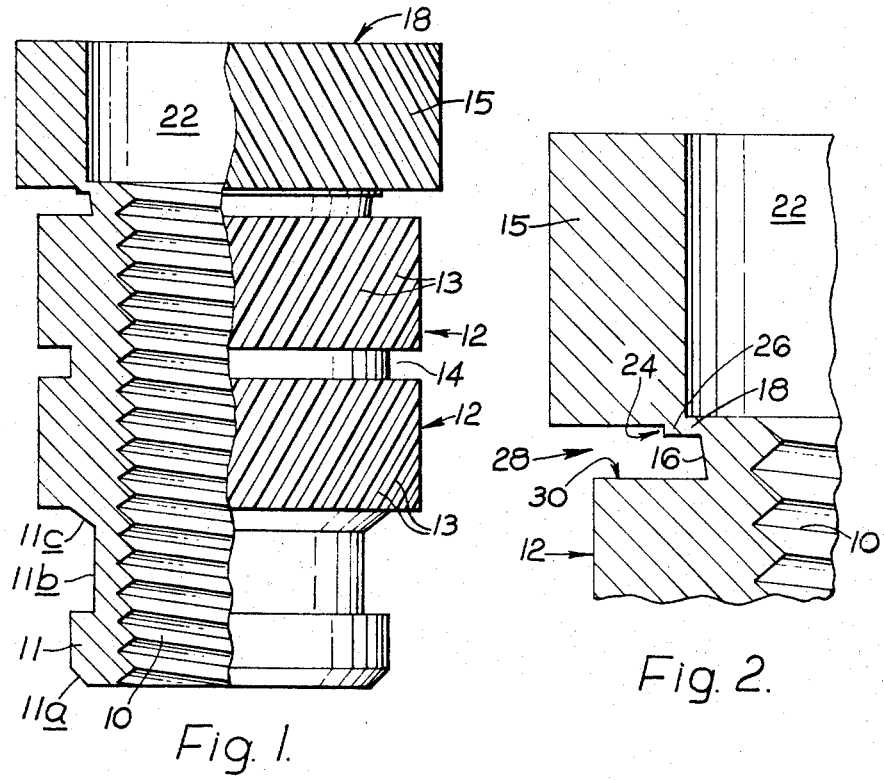
Fig. 1.
Fig. 2.
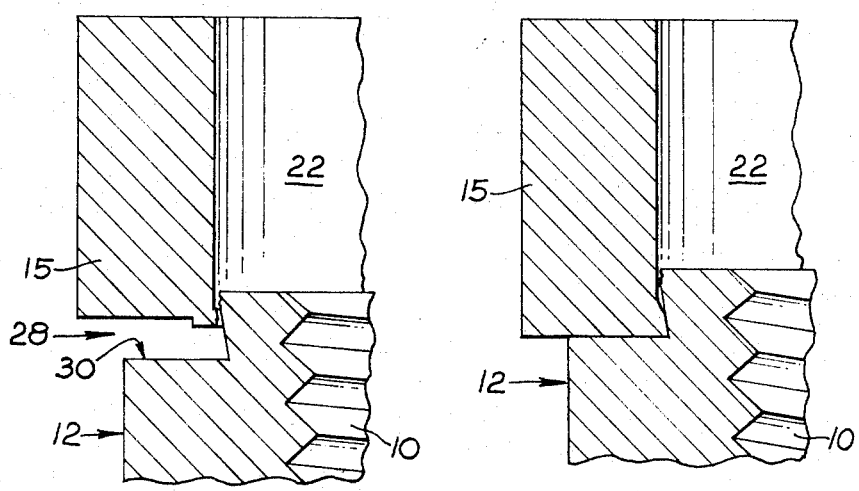
Fig. 3.
Fig. 4.

3,727,254

METHOD OF FORMING AN INSERT BUSH

BACKGROUND OF THE INVENTION

This invention relates to insert bushes adapted to provide a screw anchorage point in soft material, and comprising a body formed with an internally screw-threaded bore, and with inclined fins or teeth on the external periphery of the body, so that it may be pressed by a primarily axial movement into a pilot hole formed for the purpose in the work, and in entering into the work will be turned angularly as the teeth cut complementary recesses in the work.

Such inserts resist pull-out or axial load, due to the frictional resistance to turning.

It has previously been proposed to provide a ring at one end of the insert bearing teeth of the opposite hand to those on the body, so that when the ring is driven into the work immediately after the insert, it will cut teeth in the opposite direction, and then if the body tends to rotate under pull-out load it will jam against the ring, and because it will tend to rotate the ring in the direction which screws the ring further into the work, removal of the insert by this applied load will not occur. However, such known inserts were inconvenient, because particularly when made in smaller sizes, the correct insertion of the ring was difficult.

SUMMARY OF THE INVENTION

The object of the present invention is to provide an improved insert of this kind which is particularly convenient for insertion into workpieces. A further object of the invention is to provide an improved method of manufacturing inserts of this kind.

In accordance with the present invention, an insert for providing a screw-threaded anchorage point in work comprises a body formed with at least one band of inclined teeth or fins on its outer periphery, and a ring also having inclined teeth on its outer periphery, but of the opposite hand to the teeth on the body, the ring being larger in diameter than the body, and being axially captive but rotationally free to the body.

According to another aspect of the invention, a method of making an insert comprising a body having teeth on its periphery and a ring which is axially captive and rotationally free to the body, comprises forming the ring and body as a single component with a thin neck of material therebetween and with a shoulder provided on a face located in the space between the ring and body, and displacing the ring and body relative to one another and towards one another so as to shear the two at the neck therebetween, and impact the shoulder so as to deform material radially inwardly so as to make the parts axially captive together.

BRIEF DESCRIPTION OF THE DRAWINGS

FIG. 1 is an enlarged part sectional elevation of an insert;

FIG. 2 is a fragmentary sectional elevation of the same on an enlarged scale, FIGS. 1 and 2 showing the parts in a first stage of the manufacturing method to be described.

FIG. 3 illustrates an intermediate step in the manufacturing method, and is generally similar to FIG. 2, and FIG. 4 is a view again similar to FIGS. 2 and 3 showing the completed insert in one respect.

DESCRIPTION OF THE PREFERRED EMBODIMENT

Referring now to the drawings, the insert comprises a generally tubular body provided with a pilot section 11 which is cylindrical apart from a leading chamfer 11a, and is of the same diameter as that of a pilot hole into which the insert section is to be pressed. The pilot is spaced from the remainder of the body by a neck 11b and an aligning chamfer 11c. The body is provided with two lands 12 separated by a groove 14, the base of which is of substantially the same diameter as the pilot section 11, and the lands 12 are provided with helically extending fins or teeth 13, which are aligned, and the roots of the teeth lie on the same diameter as the pilot section 11 and groove 14, or could lie on a smaller diameter. However, the groove could be deeper, so that its diameter is less than the root diameter of the teeth on the body. On the opposite side of the lands 12 to the pilot section 11 there is a neck 16. This portion of the neck, lands, groove and pilot section is hereinafter called the body of the insert and is provided with a screw-threaded bore 10 therethrough.

Also provided, as an integral part of the insert during the initial stage of manufacture, is a ring 15 also provided with helically extending fins or teeth, but which are inclined in the opposite direction or hand to those of the lands 12. The ring 15 is of slightly larger diameter than the lands 12, so that the roots of the teeth of the ring 15 lie on a diameter equal to or larger than the maximum diameter of the lands 12. The ring 15 is bored at 22 to a diameter substantially equal to the maximum diameter of the neck 16, see FIG. 2.

The insert formed as illustrated in FIG. 1 is then axially contracted, as by an impact blow on one end face while the opposite end face is against an abutment, so as to shear the ring in the portion 18 (see FIG. 2) at the extremity of the neck 16. As seen in FIG. 2, the ring has a shoulder 26 which is a narrow annulus raised from a face of the ring by a step 24, and this step lies in the gap 28 between land 12 and ring 15.

FIG. 3 shows the parts as sheared, and as the axial deformation continues, the shoulder 26 impacts against the face 30 of the land 12 which causes the material in the shoulder to be deformed and flow radially inwards. This results in the internal periphery of the ring in the vicinity of the area 18 being reduced in diameter, and due to the neck 16 being of tapering configuration with a smallest diameter adjacent face 30, the ring is thus rendered axially captive to the body, as shown for example in FIG. 4. Nevertheless the ring is free to rotate on the body.

In installation of the insert, the pilot section 11 is entered into the hole in the workpiece and the insert is pressed in an axial direction into the workpiece, causing the teeth 13 to cut complementary recesses or grooves in the workpiece, and this is accompanied by a rotation of the insert relative to the work. Depending on the material of the workpiece, shavings of material may be displaced into the grooves 14 and/or 11b, and these may improve the locking action of the insert in the work.

When the ring 15 is moved against the face of the workpiece as a result of the axial movement, the teeth of ring 15 being of the opposite direction of inclination, will cut a fresh set of grooves, complementary to the teeth, in the work. Because the ring is of larger diameter than the body, these teeth will be acting in material which has not been affected or cut by the teeth 13 during their passage through the material. During this latter part of the insertion step the body will continue to rotate in the same direction as before, but the ring will be rotating in the opposite direction.

When the insert is pressed fully home, so that the end face of the ring remote from the body is flush with the work, and a screw is inserted into the bore 10 to clamp a component against the end face 18, the ring and body become clamped together, and are prevented from turning under pull-out loads, so that instead of relying upon frictional resistance to turning, it is shear strength of the material (or insert) which resists pull-out. The insert therefore provides a particularly secure hold against such loads whilst being convenient for manufacture and use.

I claim:

1. A method of fabricating an insert having a plurality of peripheral bands of teeth which are inclined to the axis of the insert, the teeth of a first band at one end of the insert being of hand opposite to the teeth of a second, adjacent band, wherein the improvement comprises the steps of (a) forming, between the first and second bands, a groove having a substantially frusto-conical bottom, with its smallest diameter adjacent to the second band, while forming a shoulder extending from the bottom of the groove adjacent to the first band, and forming a bore extending axially through the first band which has a diameter substantially equal to the largest diameter of the frusto-conical bottom of the groove, and (b) axially compressing the insert and thereby shearing the first band free and compressing the shoulder against the second band to deform the material of the shoulder radially inward against the frusto-conical portion, thus anchoring the first band against axial movement while leaving it free to rotate relative to the second band.

2. A method according to claim 1 wherein the first band of teeth is formed with a diameter greater than that of the second band of teeth.

* * * * *